No. 823,589. PATENTED JUNE 19, 1906.
E. W. DIETERLE.
WATER HEATER.
APPLICATION FILED JULY 13, 1905.

2 SHEETS—SHEET 1.

WITNESSES:
One G. Jordan.
Gladys Walton.

INVENTOR:
Edward W. Dieterle,
BY Hugh K. Wagner,
His ATTORNEY.

No. 823,589. PATENTED JUNE 19, 1906.
E. W. DIETERLE.
WATER HEATER.
APPLICATION FILED JULY 13, 1905.

2 SHEETS—SHEET 2.

WITNESSES:
Ina G. Jordan
Gladys Walton.

INVENTOR:
Edward W. Dieterle,
BY Hugh K. Wagner
His ATTORNEY.

UNITED STATES PATENT OFFICE.

EDWARD W. DIETERLE, OF ST. LOUIS, MISSOURI.

WATER-HEATER.

No. 823,589.  Specification of Letters Patent.  Patented June 19, 1906.

Application filed July 13, 1905. Serial No. 269,471.

*To all whom it may concern:*

Be it known that I, EDWARD W. DIETERLE, a citizen of the United States, residing in the city of St. Louis and State of Missouri, have invented certain new and useful Improvements in Water-Heaters, of which the following is a specification.

This invention relates to a superior arrangement of water tubes or coils in a water-heater so as to secure the maximum effect of the heat from a suitable source of heat-supply judiciously located.

Figure 1:
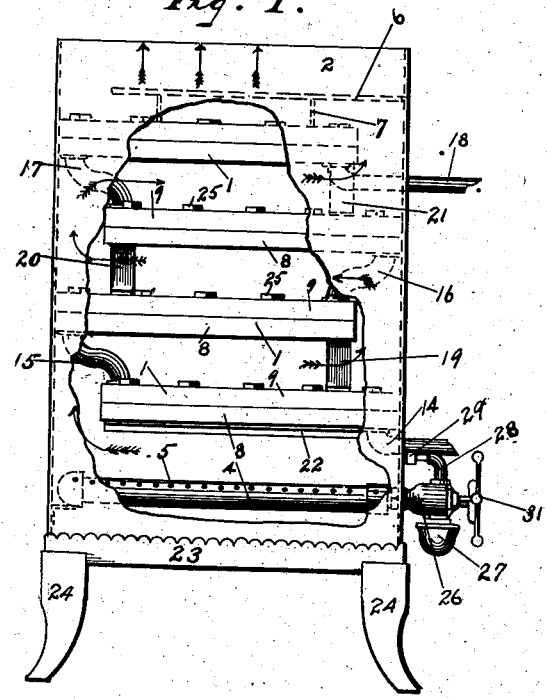
Figure 2:
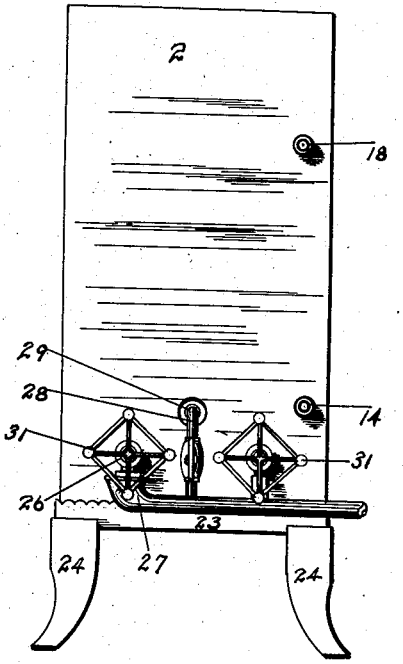
Figure 3:
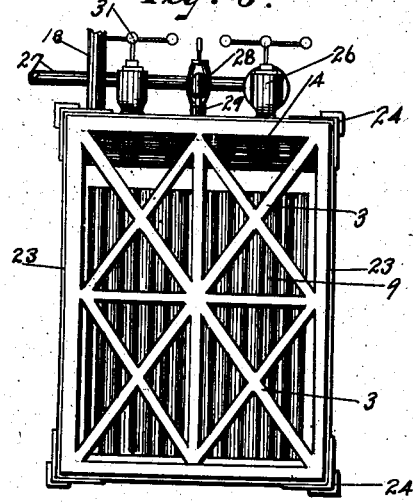
Figure 5:
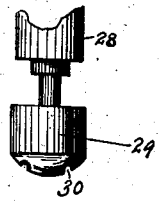
Figure 4:
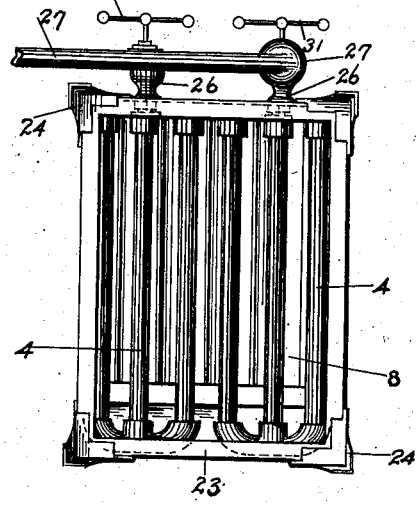
Figure 6:
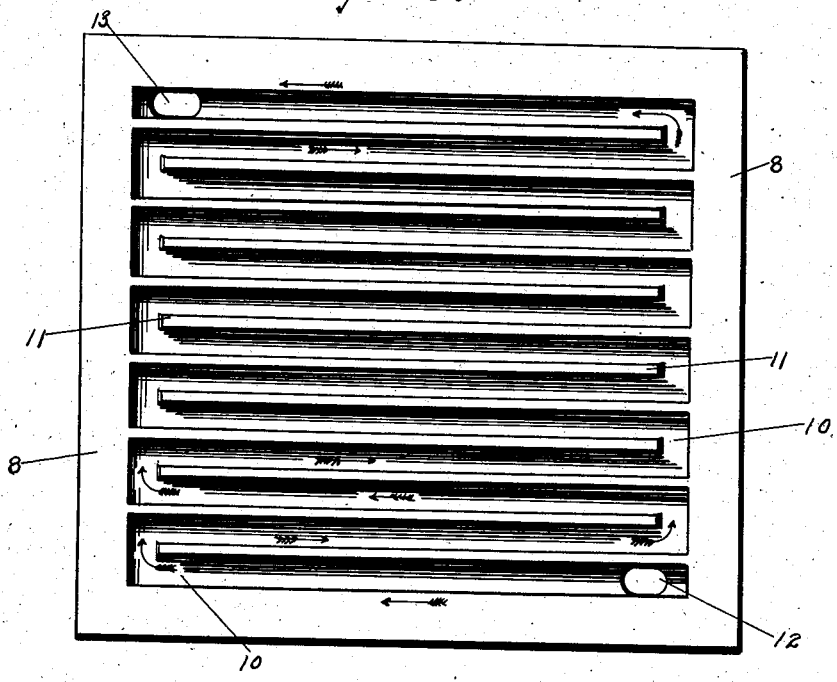

In the drawings accompanying this specification and forming part thereof, in which like numbers of reference denote like parts wherever they occur, Figure 1 is a front elevation with the front wall partly broken away. Fig. 2 is a side elevation. Fig. 3 is a top plan view. Fig. 4 is a bottom plan view. Fig. 5 is a detail view of the igniter. Fig. 6 is a top plan view of the lower half or the lower section of one of the heating-coils, and Fig. 7 is a sectional view through one such heating-coil.

The water-coils 1 are located within the casing 2 and are superimposed one above the other in any desired number. While in the drawings I have illustrated four tiers of tubes or four coils and in general have exhibited my invention as applied to a water-heater for a bath-room, yet by approximately doubling the size of said coils and approximately doubling their number my invention can be applied to the heating of houses by the hot-water or steam method, and by judicious increase of the size and number of the coils and heating means same can be adapted to the heating of a building of any size and to various other purposes.

The casing 2 is air-tight on its vertical sides, but open at the bottom and top for purposes of draft, an unusually-open grating 3 being displayed in Fig. 3. The water-coils 1, as clearly shown in Fig. 1, are arranged in a staggered fashion, one end of each abutting closely against one of the vertical walls of the casing 2, while the opposite end thereof does not abut against one of the vertical walls of the casing 2. The side edges of each coil, however, abut closely against the front and rear walls of the casing 2, as clearly shown in Fig. 3. By this means it is insured that the heat rising from the source of heat (shown in the drawings as comprising a plurality of gas-burners in the form of pipes 4, containing a plurality of perforations 5) shall first contact with the under side of the lowest water-coil 1 and every part thereof. As it is the natural tendency of heat to rise, the heat thence passes in a current in the direction indicated by the arrows. In so doing in the second stage of its progress it comes in direct contact with the upper side of the lowest water-coil and with the under side of the second water-coil. Thence, still following the course indicated by the arrows, it passes between the upper side of the second coil and the lower side of the third one, in every instance coming into direct contact with the entire expanse of first the inside and then the upper side of each one of the coils, and so on until it has passed the highest one of the coils. In order that the heat may be forced into contact with the upper side of the highest coil, an asbestos plate or deflector 6 is located thereabove and almost entirely covers same, being held in position in any desired manner, but being shown in the drawings as supported on the highest coil 1 by the legs or supports 7.

Figure 7:
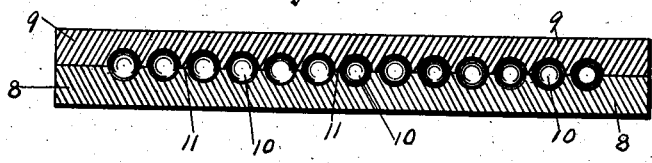

Each of the water-coils 1 is preferably formed of a pair of grooved plates 8 and 9, the grooves 10 in the plate 9 registering opposite the grooves 10 in the plate 8 and the diaphragms 11 in the plate 8 registering with the diaphragms 11 in the plate 9, so as to convert said oppositely-facing grooves 10 into tubes, as shown in Fig. 7, which provide an elongated and serpentine passage for the water from the point of entrance 12 to the point of exit 13. In this way it will be perceived that the water is exposed for the longest period of time possible to the action of the heat, which by reason of the serpentine path in which the heat is directed on account of the staggered arrangement of the coils 1, as hereinabove described, is brought into close contact with both the bottom and the upper side of each one of the grooves or tubes 10. This in the arrangement shown in Fig. 6 exposes the water to the action of the heat while passing through a distance thirteen times the length of the grooves 10 in the plates 8 and 9, and since the heat acts equally on the under side and on the upper side of each of the coils 1 it follows that heat is applied to the water in one of the coils 1 in a distance equivalent to twenty-six times the length of one of the grooves 10.

Assuming that one of the grooves 10 shown in Fig. 6 is one foot long, (which is the size that I have used in actual practice,) the water passes through thirteen feet in each one of the coils shown in Fig. 1 and is exposed to twenty-six feet of well-directed heat during such passage, making a total in the four coils of Fig. 1 of one hundred and four feet. From the arrangement of the plurality of tubes or gas-burners 4 underneath the lowest water-coil 1 and the staggered arrangement of a plurality of coils 1 and the provision for the escape of the heat from underneath each one only at one end thereof and not at all at the other end nor by the sides and by reason of the fact that the water enters the lowest one of these coils at the inlet-port 14 and passes in a serpentine path, as plainly seen in Fig. 6, until it reaches the exit 13, into which the pipe 15 is fitted, and then passes through the pipe 15 until it enters the inlet 12, which leads to the next highest coil 1, thereupon following a like serpentine course through said second coil 1 until it passes through the pipe 16, which similarly connects the second coil 1 with the third coil 1, and after passing through the serpentine course in the third coil 1 and out from same through the pipe 17 and through a serpentine course in the highest coil 1 until it reaches the exit-pipe 18, which connects to the lower side of the highest coil 1, it will be evident that a maximum degree of application of the heat to the water will be secured. In practice I have found that a continuous stream of boiling water may be drawn from the exit-pipe 18. This makes the device practical and in the highest degree satisfactory for the uses contemplated and set forth above. Thus is secured the greatest economy of fuel and also much quicker results in the way of water heated to the desired temperature.

The pipes 15, 16, and 17 are suitably fitted by water-tight joints into the upper and lower sides of the coils 1, between which they are located, and serve to space said coils apart and also to support the upper ones upon the lower ones. At the end of the second coil 1, opposite the pipe 15, is located a standard 19 to support the second coil 1 at that end. A similar standard 20 is placed at the end of the third coil opposite the pipe 16 and for a like purpose. The standard 21 supports the highest coil 1 at the opposite end to pipe 17 in similar manner. The lowest coil 1 is partially supported by the inlet water-pipe 14 and also by angle-irons 22, only one of which is shown in Fig. 1, the other being attached to that part of the front wall of the casing 2 that is broken away. The casing 2 fits into and rests upon a rectangular frame 23, which in turn rests on sockets in the legs 24. The plates 8 and 9 are bolted together with the bolts 25.

In Fig. 4 the source of heat is depicted as consisting of a pair of branched gas-burners, each burner consisting of three tubes 4 and each tube 4 being supplied with a plurality of rows of perforations 5 in its upper arc and each group of three tubes being supplied from an inlet-pipe 26, to which a supply-pipe 27 leads by suitable branches. Projecting from said supply-pipe 27 is the branched pipe 28, leading to the igniter 29, containing perforations 30. When the gas is admitted to the tubes 4 by opening the cocks 31 and a light is applied to the igniter 29, the latter throws a flame obliquely across the six tubes 4 forming the burners.

It will be understood that many minor changes in the form and arrangement of the several parts of my invention may be made; but the chief feature thereof consists in the application of heat derived from any source and introduced at a point adjacent and preferably below the lowest of a vertical column consisting of a plurality of tiers of water tubes or coils, said coils occupying a staggered relation to each other.

Having thus described my said invention, what I claim, and desire to secure by Letters Patent, is—

1. In a water-heater, a casing rectangular in cross-section and entirely open at its top and bottom, water-coils arranged in superimposed relation in said casing, each of said coils consisting of a pair of flat plates arranged to contact with one another and formed on their contacting faces with registering grooves, said coils being arranged in staggered relation and having one end and both sides of each closely abutting the adjacent walls of the casing, and the opposite end spaced from the adjacent wall of the casing, and means for supporting an upper coil from a lower one consisting of a pipe at one end establishing communication between adjacent coils, and a standard at the opposite ends of said coils.

2. In a water-heater, a casing entirely open at its ends, water-coils in superimposed and staggered relation in said casing, each of said coils consisting of a pair of flat-faced plates secured together and formed on their contacting faces with semicircular grooves which register and form tubes, the lower plate of each coil having an opening therein at one corner, and the upper plate of each coil having an opening therein at an opposite corner to said first-named corner, pipes leading into said openings of the plates, said pipes leading from the opening of an upper plate into the opening of a lower plate, and standards arranged between the opposite ends of said plates of the coils.

3. In a water-heater, a casing, water-coils in superimposed relation therein, each of said coils consisting of a pair of solid flat-faced plates arranged to contact with one another and grooved on their contacting faces to form tubes therebetween, each of said plates having an opening therein, the opening of an upper plate underlying and being adjacent to the opening of an under plate, a pipe leading into each of said openings, and a deflector supported by the uppermost coil and extending beyond one end of the same to contact with one side of said casing and at its opposite end being spaced from the side of said casing opposite to said first-named side thereof.

In testimony whereof I have affixed my signature in presence of two witnesses.

EDWARD W. DIETERLE.

Witnesses:
M. E. JOHNSON,
GLADYS WALTON.